United States Patent
Greenberg et al.

(10) Patent No.: US 7,624,061 B2
(45) Date of Patent: Nov. 24, 2009

(54) METHOD AND SYSTEM FOR EXCHANGING COMMODITIES ONLINE

(76) Inventors: Michael Greenberg, 1030 N. State St. #491, Chicago, IL (US) 60610; Christian A. S. Pensa, Av. Dr. Eugenio Salerno, Sorocaba 18035-430 S.P. (BR); Patrick Zaouter, 3 Avenue George V, 75008 Paris (FR)

( * ) Notice: Subject to any disclaimer, the term of this patent is extended or adjusted under 35 U.S.C. 154(b) by 1959 days.

(21) Appl. No.: 09/922,240

(22) Filed: Aug. 3, 2001

(65) Prior Publication Data

US 2002/0107782 A1  Aug. 8, 2002

Related U.S. Application Data

(60) Provisional application No. 60/224,008, filed on Aug. 4, 2000.

(51) Int. Cl.
*G06Q 40/00* (2006.01)
(52) U.S. Cl. .............................. 705/37; 705/35; 705/36; 705/38; 705/39
(58) Field of Classification Search ............. 705/35–39
See application file for complete search history.

(56) References Cited

U.S. PATENT DOCUMENTS

| | | | |
|---|---|---|---|
| 5,136,501 A | | 8/1992 | Silverman et al. |
| 5,694,551 A | * | 12/1997 | Doyle et al. ................... 705/26 |
| 5,710,887 A | * | 1/1998 | Chelliah et al. ............... 705/26 |
| 5,715,402 A | | 2/1998 | Popolo |
| 5,724,524 A | | 3/1998 | Hunt et al. |
| 5,732,400 A | | 3/1998 | Mandler et al. |
| 5,794,207 A | * | 8/1998 | Walker et al. ................... 705/1 |
| 5,999,914 A | * | 12/1999 | Blinn et al. .................... 705/26 |
| 6,035,289 A | | 3/2000 | Chou et al. |
| 6,058,379 A | | 5/2000 | Odom et al. |
| 6,064,981 A | | 5/2000 | Barni et al. |
| 6,219,653 B1 | | 4/2001 | O'Neill et al. |
| 6,263,317 B1 | * | 7/2001 | Sharp et al. .................... 705/26 |
| 6,460,020 B1 | * | 10/2002 | Pool et al. ...................... 705/26 |

OTHER PUBLICATIONS

"TradingProduce.com Revolutionizes Produce Trading", Business Wire, Jan. 10, 2000, extracted on the Internet from Database, "Corporate ResourceNet", on Sep. 27, 2001.

"CoreMarkets Selects ebusiness Technologies' Dynabase to Power Digital Marketplace of Industrial Materials Dynabase Will Support International *Commodities* Exchange of Ferro Alloys and Bulk Ores", PR Newswire, Jul. 17, 2000, extracted on the Internet from Database, "Corporate ResourceNet", on Sep. 27, 2001.

\* cited by examiner

*Primary Examiner*—Daniel S Felten
(74) *Attorney, Agent, or Firm*—Cardinal Law Group

(57) ABSTRACT

A method of providing a best bid and a best offer to a buyer, including receiving one or more offers to sell a commodity according to a predetermined contract at one or more specified prices. The specified prices are adjusted based on shipping costs associated with a destination specified by the buyer. A best offer is determined from the adjusted prices. A source location is determined corresponding to the best offer price. One or more bids are received to purchase the commodity. A best bid is determined corresponding to the source location. The best bid is adjusted based on the shipping cost between the source location and the destination and the adjusted best bid and the best otter are transferred to the buyer over a computer network for display by a networked host.

1 Claim, 14 Drawing Sheets

Rail Car Specifications

- Each shipment shall be a net weight of approximately 190,000 lbs.
- Each shipment shall occur within 3 business day of receipt of notice of a matched trade.
- All deliveries will be shipped in rail cars that bear no identifying markings of the seller.

FIG.3

Truckload Specifications

- Each shipment shall be a net weight of approximately 42,000 lbs.
- All shipments will be packaged in gaylords standards in the industry
- The net weight of each gaylord shall be clearly marked on each package.
- The gaylord weights in each truckload will be consistent with one another
- The gross weight, net tare, will be added to the bill of lading.

FIG.2

The PlasticsExchange.com

USER ID

PASSWORD

OK

Exchanged Demo

About Us

Alliances

FAQS

Glossary

Contracts traded

Contact Us

○ home
○ charts
○ news
○ research
○ callback
○ apply

Contracts Traded

- HDPE – HIC Blow Molding
- HDPE – Inj. Molding – Crate Grade
- HDPE – Inj. Molding – Pail Grade
- HDPE - Inj. Molding – GP – 20 melt
- HMWPE – Film Grade
- LDPE – Film Grade – Clarity – Medium Additives
- LDPE – Film Grade – Clarity – No Additives
- LDPE – Film Grade – Liner – Medium Additives
- LDPE – Film Grade – Liner – No Additives
- LDPE – Inj. Molding GP – 20 melt
- LLDPE – Film Grade – Butene – High Additives
- LLDPE – Film Grade – Butene – Medium Additives
- LLDPE – Film Grade – Butene – No Additives
- LLDPE – Film Grade – Hexene – High Additives
- LLDPE – Film Grade – Hexene – Medium Additives
- LLDPE – Film Grade – Hexene – No Additives
- LLDPE – Inj. Molding – 50 melt
- LLDPE – Inj. Molding  GP – 20 melt
- Polystyrene General Purpose – Inj. Molding – 8 melt
- Polystyrene High Impact – Inj. Molding – 8 melt

Contract Specifications

HDPE – Inj. Molding GP – 20 melt

| | |
|---|---|
| Family | Polyethylene |
| Category | High Density |
| Process | Injection Molding |
| Features | General Purpose |
| Melt Flow Target | 20.00 |
| Melt Flow Range | 18.00-24.00 |
| Density Target | 0.953 |
| Density Range | 0.950-0.955 |

Conforming Brands

Certene (TM) HD- 1953
Mobil HDPE HMA-047
Formolene® LH5320
Eraclene® MR 80

The PlasticsExchange.com 1-800-850-2380    info@ThePlasticExchange.com

Contracts Specifications

TRUCKLOAD: 42,000 lbs.   RAIL CAR: 190,000 lbs.

| Family | Category | Process | Features | Melt Flow Tgt | Melt Flow Range | Density Tgt | Density Range | Izod Tgt | Izod Range | Additive Levels Sup | Additive Levels Arch Blo |
|---|---|---|---|---|---|---|---|---|---|---|---|
| Polyethylene | HMW | Film | 8-15 HLMI | 0.08 | 0.05-0.10 | 0.950 | 0.948-0.952 | | | | |
| Polyethylene | High Density | Injection Molding | Crate Grade | 8.00 | 6.00-10.00 | 0.962 | 0.960-0.965 | | | | |
| Polyethylene | High Density | Blow Molding | HIC | 0.30 | 0.25-0.38 | 0.953 | 0.952-0.955 | | | | |
| Polyethylene | High Density | Injection Molding | General Purpose | 20.00 | 18.00-24.00 | 0.953 | 0.950-0.955 | | | | |
| Polyethylene | High Density | Injection Molding | Pail Grade | 7.00 | 6.00-8.00 | 0.953 | 0.950-0.955 | | | | |
| Polyethylene | Low Density | Film | Clarity, less 6% Haze | 2.00 | 1.50-2.50 | 0.920 | 0.918-0.924 | | | 0 | 0 |
| Polyethylene | Low Density | Film | Clarity, less 6% Haze | 2.00 | 1.50-2.50 | 0.920 | 0.918-0.924 | | | 650-950 | 1300-210 |
| Polyethylene | Low Density | Film | Liner | 2.00 | 1.50-2.50 | 0.920 | 0.918-0.924 | | | 0 | 0 |
| Polyethylene | Low Density | Film | Liner | 2.00 | 1.50-2.50 | 0.920 | 0.918-0.924 | | | 650-950 | 1300-210 |
| Polyethylene | Low Density | Injection Molding | General Purpose | 20.00 | 18.00-26.00 | 0.922 | 0.920-0.924 | | | | |
| Polyethylene | Linear Low Density | Film | Butene | 1.00 | 0.80-1.20 | 0.920 | 0.918-0.924 | | | 0 | 0 |
| Polyethylene | Linear Low Density | Film | Butene | 1.00 | 0.80-1.20 | 0.920 | 0.918-0.924 | | | 800-1200 | 2500-500 |
| Polyethylene | Linear Low Density | Film | Butene | 1.00 | 0.80-1.20 | 0.920 | 0.918-0.924 | | | 1000-1500 | 5000-750 |
| Polyethylene | Linear Low Density | Film | Hexene | 1.00 | 0.80-1.20 | 0.920 | 0.917-0.924 | | | 0 | 0 |
| Polyethylene | Linear Low Density | Film | Hexene | 1.00 | 0.80-1.20 | 0.920 | 0.917-0.924 | | | 750-1300 | 3000-500 |
| Polyethylene | Linear Low Density | Film | Hexene | 1.00 | 0.80-1.20 | 0.920 | 0.917-0.924 | | | 1250-2250 | 5000-800 |
| Polyethylene | Linear Low Density | Injection Molding | General Purpose | 20.00 | 16.00-24.00 | 0.920 | 0.918-0.925 | | | | |
| Polyethylene | Linear Low Density | Injection Molding | | 50.00 | 43.00-57.00 | 0.920 | 0.918-0.925 | | | | |
| Polyethylene | General Purpose | Injection Molding | | 8.00 | 6.00-10.00 | | | | | | |
| Polystyrene | High Impact | Injection Molding | | 8.00 | 6.00-9.00 | | | 2.00 | 1.70-2.10 | | |
| Polypropylene | Impact Copolymer | Injection Molding | | 10.00 | 8.00-12.00 | | | 2.00 | 1.80-2.50 | | |
| Polypropylene | Impact Copolymer | Injection Molding | | 20.00 | 18.00-24.00 | | | 2.00 | 1.80-2.50 | | |
| Polypropylene | Impact Copolymer | Injection Molding | | 4.00 | 3.00-5.00 | | | 2.50 | 2.20-2.80 | | |
| Polypropylene | Random Copolymer | Injection Molding | Clarity | 12.00 | 10.00-14.00 | | | | | | |
| Polypropylene | Random Copolymer | Injection Molding | Clarity | 32.00 | 28.00-38.00 | | | | | | |
| Polypropylene | Homopolymer | Injection Molding | High Flow | 32.00 | 28.00-38.00 | | | | | | |
| Polypropylene | Homopolymer | Injection Molding | General Purpose | 12.00 | 10.00-14.00 | | | | | | |

FIG. 5

The PlasticsExchange.com

○ charts
○ news
○ research
○ callback

Priced Delivered FOB Akron, OH

| Buyer's Name |
|---|
| Home/logout |
| Trading floor |
| Buy order entry |
| Branded market |
| Working orders |
| Filled orders |
| System messages |
| Account balance |
| Exchange filters |

Buyer's Trading Floor

| Contracts | truck load 42,000 lbs | | | rail car 190,000 lbs | | |
|---|---|---|---|---|---|---|
| | Qty | Bid Ask | Qty | Qty | Bid Ask | Qty |
| ▲ HPDE – HIC Blow Molding | 3 | .572 .601 | 3 | 6 | .525 .535 | 3 |
| ▲ HDPE – Inj Mold – Pail Grade | 3 | .507 .531 | 2 | 3 | .460 .465 | 2 |
| ▲ HMWPE – Film Grade | 3 | .602 .611 | 3 | 5 | .565 .569 | 3 |
| ▲ LDPE – Film Grade – Liner – Medium Additives | 4 | .577 .591 | 4 | 2 | .499 .508 | 5 |
| ▲ LDPE – Film Grade – Liner – No Additives | 3 | .572 .581 | 3 | 5 | .547 .551 | 3 |
| ▲ LDPE – Inj Mold GP – 20 melt | 2 | .537 .541 | 3 | 3 | .512 .517 | 3 |
| ▲ LLDPE – Inj Mold – 50 melt | 2 | .522 .531 | 2 | 2 | .465 .475 | 2 |
| ▲ LLDPE – Inj Mold GP – 20 melt | 3 | .522 .531 | 2 | 6 | .456 .466 | 4 |
| ▲ Polystyrene General Purpose – Inj Mold – 8 melt | 2 | .632 .641 | 2 | 4 | .565 .575 | 3 |
| ▲ PP Homopolymer – Inj Mold GP – 12 melt | 2 | .492 .496 | 3 | 3 | .420 .429 | 4 |

Place Bid
Branded Market
Working Orders
Filled Orders
Price Chart
Contract Specs

FIG. 6

The PlasticsExchange.com

○ DEMO
○ charts
○ news
○ research
○ callback

- Buyer Name
- Home/logout
- Trading floor
- Buy order entry
- Branded market
- Working orders
- Filled orders
- System messages
- Account balance
- Exchange filters

Buy Order Entry

| truck load 42,000 lbs. | | rail car 190,000 lbs. | |
|---|---|---|---|
| Bid | Ask | Bid | Ask |
| .561 | .564 | .560 | .564 |

Quantity
[ 3 ] [▼]
• Truckloads* (42,000 lbs)
○ Rail Cars* (190,000 lbs)

Delivery Point
[ Akron, OH ]

Contracts
[ LDPE – Film Grade – Clarity – Medium Additives ]

Buying Price FOB Delivery Point
$ [ .564 ▲▼ ] per lb.

*All quantities are estimated. Actual values will be calculated at completion of order.

[ SUBMIT ]

FIG. 7

The PlasticsExchange.com

Buyer Name
Home/logout
Trading floor
Buy order entry
Branded market
Working orders
Filled orders
System messages
Account balance
Exchange filters

DEMO

○ charts
○ news
○ research
○ callback

Buyer's Working Orders

Search [    ] by Date [▼] Search [    ] Show all

| Del | Change Date | Bid# | Size | Contract | Price | Best Ask | Delivery Point |
|---|---|---|---|---|---|---|---|
| X | △ | 8/4 | 110 | 5 Truckload | LDPE – Film Grade – Liner Med Adds | 553 | .559 | Paterson, NJ |
| X | △ | 8/4 | 109 | 5 Truckload | LDPE – Film Grade – Liner Med Adds | 553 | .559 | Paterson, NJ |
| X | △ | 8/4 | 108 | 3 Rail Car | LDPE – Film Grade – Liner Med Adds | 534 | .540 | Fort Worth, TX |
| X | △ | 8/4 | 107 | 2 Truckload | LDPE – Film Grade – Liner Med Adds | 549 | .556 | Chattanooga, TN |
| X | △ | 7/18 | 30 | 3 Rail Car | LDPE – Film Grade – Liner Med Adds | 540 | .540 | Chicago, IL |

*All quantities are estimated. Actual values will be calculated at completion of order

[trading floor]

Order – Confirmation Message

You're going to place an order to buy 3 Truckloads of
LDPE – Film Grade – Clarity – Medium Additives
For $.584 per pound
Estimate Value: $73,584
Delivery to: Akron, OH

[Confirm]  [Cancel]

DEMO

FIG. 8

The PlasticsExchange.com

DEMO

○ charts  ○ news  ○ research  ○ callback

Buyer's Filled Orders

Search [_____] by [Date ▼]  [Search] [Show all]

| Status | Date | Order# | Size* | Contract | Price | Value | Delivery Point |
|---|---|---|---|---|---|---|---|
| Inventory | 8/3 | 9 | 1 Truckload | LDPE – HIC Blow Molding; Generic | .564 | $23,688 | Akron, OH |

[trading floor]

*All quantities are estimated. Actual values will be calculated at completion of order. Estimate values are in red, actual values are in black.

- Buyer Name
- Home/logout
- Trading floor
- Buy order entry
- Branded market
- Working orders
- Filled orders
- System messages
- Account balance
- Exchange filters

The PlasticsExchange.com

DEMO

○ charts  ○ news  ○ research  ○ callback

Sell Order Entry

| truck load 42,000 lbs. | | rail car 190,000 lbs. | |
|---|---|---|---|
| Bid | Ask | Bid | Ask |
| .521 | .541 | .459 | .469 |

Quantity

- Truckloads* (42,000 lbs)
- ○ Rail Cars* (190,000lbs)

[4 ▼]

Contracts

[HDPE – HIC – Crate Grade ▼]

[Petromont® DMDA - 8007 ▼]

Shipping Point

[Akron, OH ▼]

Selling Price FOB Shipping Point

$. [574 ▲▼] per lb.

*All quantities are estimated. Actual values will be calculated at completion of order.

[SUBMIT]

Seller Name
Home/logout
Trading floor
Sell order entry
Working orders
Filled orders
System messages
Account balance
Exchange filters
glossary

FIG. 12

The PlasticsExchange.com

DEMO

| Home/logout |
| Trading floor |
| Buy order entry |
| Working order |
| Filled orders |
| System messages |
| Account balance |
| Exchange filters |
| glossary |

Branded Market        FOB Delivery Point: Akron, OH ▼        Contract: HDPE – Inj. Molding – Crate Grade ▼

○ charts   ○ news   ○ research   ○ callback

Truckload
Quantity  Price   Brand                           Buy

0 ▶      0.564  Daelim Poly® LH-6070UV          SUBMIT
0 ▶      0.572  Alathon® M 6060                 SUBMIT
0 ▶      0.573  Chevron PE HID 9708             SUBMIT
0 ▶      0.574  Petromont® DMDA-8007            SUBMIT
    0
    1
    2
    3

Rail Car
Quantity  Price   Brand                           Buy

0 ▶      0.469  Alathon® M 6060                 SUBMIT
0 ▶      0.470  Alathon® M 6062                 SUBMIT
0 ▶      0.472  Alathon® M 6060                 SUBMIT
0 ▶      0.473  Chevron PE HID 9708             SUBMIT
0 ▶      0.474  Petromont® DMDA-8007            SUBMIT
0 ▶      0.476  Alathon® M 6062                 SUBMIT

FIG. 13

The PlasticsExchange.com

DEMO

○ charts ○ news ○ research ○ callback

| Buyer Name | |
|---|---|
| Home/logout | Sending a Message |
| Trading floor | Sending a message to, |
| Buy order entry | The Plastics Exchange ▼ |
| Branded market | Message body |
| Working order | [         ◄ ► ] SUBMIT |
| Filled orders | |
| System messages | Message Queue |
| Account balance | |
| Exchange filters | |

| | | |
|---|---|---|
| August 03, 3000 19:50 | CHANGED | #12 to BUY 6 Truckloads of HMWPE – Film Grade for $.520 per pound. Delivery to Brandon, MS. Estimate value $131,040 |
| August 03, 3000 19:50 | TO | #13 to buy 7 Truckloads of HMWPE – Film Grade for $.520 per pound. Delivery to Brandon, MS. Estimate value $152,880 |
| August 03, 3000 19:49 | CHANGED | #10 to buy 4 Truckloads of HMWPE – Film Grade for $.520 per pound. Delivery to Brandon, MS. Estimate value $87,360 |
| August 03, 3000 19:49 | TO | #12 to buy 6 Truckloads of HMWPE – Film Grade for $.520 per pound. Delivery to Brandon, MS. Estimate value $131,040 |
| August 03, 3000 19:48 | PLACED | #11 to buy 1 Rail Car of LLDPE – Film Grade – Hexene – High Additives for $.510 per pound. Delivery to Evansville, IN. Estimate value $96,900 |
| August 03, 3000 19:47 | PLACED | #10 to buy 4 Truckloads of HMWPE – Film Grade for $.520 per pound. Delivery to Brandon, MS. Estimate value of $87,360 |
| August 03, 3000 19:47 | FILLED | #9 You bought 1 Truckload of HDPE – HIC Blow Molding for $.564 per pound. Delivery to Akron, OH. Estimate Value of $23,688 |
| August 03, 3000 19:47 | PLACED | #9 to buy 2 Truckloads of HDPE – HIC Blow Molding for $.564 per pound. Delivery to Akron, OH. Estimate value $47,376 |

METHOD AND SYSTEM FOR EXCHANGING COMMODITIES ONLINE

RELATED APPLICATIONS

This application claims benefit of U.S. Application No. 60/224,008, filed Aug. 4, 2000.

FIELD OF THE INVENTION

The present invention generally relates to the field of commodities exchange and more specifically, the online purchasing and selling of commodities from business to business.

BACKGROUND OF INVENTION

Various commodity products are bought and sold in bulk. One example of these commodity products is plastic resin. The $100 billion virgin plastic resin market can be divided into 2 main categories, engineered resins and commodity resins. They each comprise about half of the market; there are about 33,000 different grades of engineered resins but only a few dozen different types of commodities resins. About half of the commodity resins are purchased on a contract basis, the other half in the spot market.

In the offline world, a typical spot buyer of plastics may call, for example, 5 different distributors/suppliers/ brokers/ resellers to try to source the plastic resin required. The buyer may ask the distributor for example "I am here in Chicago and I am looking for 2 truckloads of "High Density Polyethylene-HIC Blow Molding." Do you have it, and how much is it priced delivered?"

The salesperson on the other end of the phone will typically look into a database and see that they have the 2 truckloads of HDPE-HIC and notices that the nearest warehouse is in Akron, Ohio. The salesperson mentally calculates the freight cost, adds it to the cost of the resin and marks up a profit. The reply may be "Sure, $0.51 per pound delivered." The buyer writes down the quote and states that they will get back to the seller with an answer.

The buyer then calls a second distributor and asks the same question. This time the seller sees that their nearest source of resin is Houston. After adding the freight to Chicago, the new offer totals $0.525 per pound. This process typically repeats until the buyer has a minimal number of quotes, for example, five quotes. The buyer typically calls the cheapest distributor and purchases the resin.

Once a transaction has been confirmed, the distributor then must contact their logistics department to begin the transportation process. A notice is also sent to the credit department, and they generate a receivable that must be collected. Terms are generally net 30 days; the seller will typically collect in 52-57 days.

With the insurgence of dot-com competition, some online marketplaces for plastics resin have developed. There are catalogues, auctions and bulletin boards. Some include search and sort functions to navigate through the nonstandardized offers of plastic resins. Non-standardized options include quantities ranging from hundreds of pounds to thousands of kilos to metric tons and railcars; priced in US Dollars, Euros, Yen, or Pesos; and delivery methods, with source and delivery locations spanning the globe. Offers may last from hours to weeks, and if a transaction does occur, the buyer and seller must work out delivery logistics and payment terms. In addition, information is private on these types of sites with deals being viewable to only the buyer and seller, preventing price discovery for the rest of the market. Though operational, these marketplaces lack the continuity and assurance of a standardized marketplace such as a commodities exchange.

Thus, there is a need for a method and system for a commodities exchange of bulk products. In addition, the method and system for a commodities exchange should also perform the transactions with anonymity of both parties, in order for a truly unbiased and open market to operate. This invention provides a method for buying and selling commodities in a real-time bid/ask marketplace with all bids and offers anonymous, and all trades for delivery only.

SUMMARY OF THE INVENTION

One aspect of the present invention provides a method for providing a commodity offer price to a buyer, including receiving an offer to sell a commodity according to a predetermined contract at a specified price, adjusting the specified price based on shipping costs and transferring the adjusted price to the buyer over a computer network for displaying by a remote client.

In other aspects of the invention the step of adjusting may include adding the shipping costs to the specified price to produce the adjusted price. The invention can further provide receiving a shipping destination from the buyer, receiving a shipping origin from the seller, computing the shipping costs as a function of the distance between of the shipping destination and shipping origin and adding the shipping costs to the specified price to produce the adjusted price.

Another aspect of the present invention provides a method for providing a bid to a seller, including receiving a bid to purchase a commodity according to a predetermined contract discounting the bid based on shipping costs and transferring the discounted bid to the seller over a computer network for displaying by a remote terminal.

In other aspects of the invention the step of discounting may include subtracting the shipping costs from the bid to produce the discounted bid. The invention may include receiving a shipping destination from the buyer, receiving a shipping origin from the seller, determining the shipping costs based on the shipping destination and shipping origin and subtracting the shipping costs from the bid to produce the discounted bid.

Another aspect of the present invention provides a method of providing a best bid and a best offer to a buyer, including receiving one or more offers to sell a commodity according to a predetermined contract at one or more specified prices. The specified prices are adjusted based on shipping costs associated with a destination specified by the buyer. A best offer is determined from the adjusted prices. A source location is determined corresponding to the best offer price. One or more bids are received to purchase the commodity. A best bid is determined corresponding to the source location. The best bid is adjusted based on the shipping cost between the source location and the destination and the adjusted best bid and the best offer are transferred to the buyer over a computer network for display by a networked host. The shipping cost may be computed as a function of the distance between the destination and the source location.

In other aspects of the invention the shipping cost may be computed as a function of a predetermined freight matrix.

Another aspect of the present invention provides a method of providing a best bid and a best offer to a seller, including receiving one or more bids to purchase a commodity according to a predetermined contract, adjusting the bids based on shipping costs associated with a source location specified by the seller, determining a best bid from the adjusted bids, determining a shipping destination corresponding to the best bid, receiving one or more offers to sell the commodity, determining a best offer corresponding to the shipping destination, adjusting the best offer based on the shipping cost between the source location and the shipping destination and transferring the adjusted best offer and the best bid to the seller over a computer network.

In other aspects of the invention the shipping cost may be computed as a function of the distance between the destination and the source location. The shipping cost may be computed as a function of a predetermined freight matrix.

Another aspect of the invention provides a system for exchanging commodities, including means for permitting a seller to enter an offer for selling a commodity according to a predetermined contract, means for permitting a buyer to enter a bid for purchasing the commodity, means for matching the bid to the offer to generate a transaction, means for notifying a transportation partner of the transaction so that the transportation partner can arrange pick-up and delivery of the commodity and means for notifying a credit clearinghouse of the transaction so that the clearinghouse can arrange to receive payment from buyer and make payment to the seller.

Another aspect of the invention provides an exchange system, including a buyer interface for displaying a menu for selecting a shipping destination and for displaying a table identifying one or more commodity contracts and corresponding buyer market prices for the commodity contracts, the buyer market prices being adjusted based on the shipping destination and a seller interface for displaying a menu for selecting a shipping origination and for displaying a table identifying the commodity contracts and corresponding seller market prices for the commodity contracts, the seller market prices being adjusted based on the shipping origination.

In other aspects at least one of the buyer market prices may include a best offer and a best bid. The best offer may be computed by adding to one or more offers the cost of shipping between a respective shipping origin and the shipping destination, whereby generating one or more adjusted offers, and then selecting the lowest adjusted offer to be the best offer. The best bid may be computed by determining a shipping origin corresponding to a best offer, determining a highest bid available to a seller at the shipping origin, and adjusting the highest bid based on the shipping cost between the shipping origin and the shipping destination to get the best bid. Each of the seller market prices may include a best offer and a best bid. The best bid can be computed by subtracting from one or more bids the cost of shipping between a respective shipping destination and a shipping origin, whereby generating one or more adjusted bids, and then selecting the lowest adjusted bid to be the best bid. The best offer can be computed by determining the shipping destination corresponding to a best bid, determining a lowest offer available to a buyer at the shipping destination, and adjusting the lowest offer based on the shipping cost between the shipping origin and the shipping destination to get the best offer. The exchange system may further include a seller order entry interface, operatively associated with the seller interface, permitting a seller to enter an offer for selling a commodity according to a predetermined contract and a buyer order entry screen, operatively associated with the seller interface, permitting a buyer to enter a bid for purchasing the commodity. The system may further include a transaction generator, operatively associated with the seller order and buyer order interfaces, for matching the bid to the offer to generate a transaction.

A delivery interface may be operatively associated with the transaction generator, for notifying a transportation partner of the transaction so that the transportation partner can arrange pick-up and delivery of the commodity. A finance interface, may be operatively associated with the transaction generator, for notifying a credit clearinghouse of the transaction so that the clearinghouse can arrange to receive payment from buyer and make payment to the seller. A login interface may be provided for permitting a user to login to the system as a buyer or a seller, the login interface causing either the buyer interface or the seller interface to be displayed to the user.

Another aspect of the invention provides a computer-usable medium storing a computer program including means for displaying a menu for selecting a shipping destination, means for displaying one or more commodity contracts and corresponding buyer market prices for the commodity contracts, the buyer market prices being adjusted based on the shipping destination, means for displaying a menu for selecting a shipping origination and means for displaying the commodity contracts and corresponding seller market prices for the commodity contracts, the seller market prices being adjusted based on the shipping origination.

Another aspect of the invention provides a computer-based system, including a buyer screen for displaying a menu for selecting a shipping destination and for identifying one or more commodity contracts and corresponding buyer market prices for the commodity contracts, each of the buyer market prices comprising a best offer and a best bid, wherein the best offer is computed by adding to one or more offers the cost of shipping between a respective shipping origin and the shipping destination, whereby generating one or more adjusted offers, and then selecting the lowest adjusted offer to be the best offer, wherein the best bid is computed by determining the shipping origin corresponding to the best offer, determining a highest bid available to a seller at the shipping origin, and adjusting the highest bid based on the shipping cost between the shipping origin and the shipping destination to get the best bid, a seller screen for displaying a menu for selecting a shipping origin and for identifying the commodity contracts and corresponding seller market prices for the commodity contracts, each of the seller market prices comprising a best offer and a best bid, wherein the best bid is computed by subtracting from one or more bids the cost of shipping between a respective shipping destination and the shipping origin, whereby generating one or more adjusted bids, and then selecting the lowest adjusted bid to be the best bid, wherein the best offer is computed by determining the shipping destination corresponding to the best bid, determining a lowest offer available to a buyer at the shipping destination, and adjusting the lowest offer based on the shipping cost between the shipping origin and the shipping destination to get the best offer, a seller order entry screen for permitting a seller to enter an offer for selling a commodity according to a predetermined contract, a buyer order entry screen for permitting a buyer to enter a bid for purchasing the commodity and an exchange engine for matching the bid to the offer to generate a transaction.

In another aspect of the invention the system can further include a delivery interface for notifying a transportation partner of the transaction so that the transportation partner can arrange pick-up and delivery of the commodity. A finance interface may be provided for notifying a credit clearinghouse of the transaction so that the clearinghouse can arrange to receive payment from buyer and make payment to the seller. A login interface may permit a user to login to the system as a buyer or a seller, the login interface causing either the buyer screen or the seller screen to be displayed to the user.

BRIEF DESCRIPTION OF THE DRAWINGS

FIG. 2 illustrates specific details of capacity and packaging;

FIG. 3 illustrates another size contract, including specific details of capacity and packaging;

FIGS. 4 illustrates the standard contracts of prime commodity specifications, in accordance with the method and system of the present invention;

FIG. 5 illustrates the specifications of a particular contract of prime commodity specifications, in accordance with the method and system of the present invention;

FIG. 6 displays a trading floor screen, in accordance with the method and system of the present invention;

FIG. 7 illustrates a buy order entry screen, in accordance with the method and system of the present invention;

FIG. 8 illustrates an order confirmation message screen, in accordance with the method and system of the present invention;

FIG. 9 illustrates a working order screen, in accordance with the method and system of the present invention;

FIG. 10 illustrates an example of a filled order screen, in accordance with the method and system of the present invention;

FIG. 11 illustrates a filled order screen, in accordance with the method and system of the present invention;

FIG. 12 illustrates a sell order entry screen, in accordance with the method and system of the present invention;

FIG. 13, illustrates a branded market screen, in accordance with the method and system of the present invention;

FIG. 14 illustrates a message board screen, in accordance with the method and system of the present invention;

DETAILED DESCRIPTION OF THE PRESENTLY PREFERRED EMBODIMENTS

The following description, in conjunction with the Figures, describes one embodiment of an exchange system for goods, made in accordance with the present invention. In accordance with the present invention, the exchange system is a real-time bid/ask marketplace for the buying and selling of commodity product. One example is the exchange of prime virgin commodity plastics resins. It is not a catalogue, auction, or bulletin board, but rather a real online commodities exchange adapted for the plastics market. All bids and offers are always anonymous, even after the trade. This is an exchange for the spot market; all trades are for delivery only.

The exchange system may reside on any electronic communication node, such as, for example, an Internet Web site. The communication node of the present invention can include, but is not limited to, an interactive voice response node, a server computer, or other suitable system. It will be recognized that the communication node may be integrated within or may be remote from the communication networks.

When a buyer applies for membership at the exchange system, the buyer is also applying for a line of credit with an online credit partner, such as, for example, B2BExchangeCredit.com. After the trade, a transportation partner, such as, for example, C H Robinson, will move the product from dock-to-dock. B2BExchangeCredit.com may act as the clearinghouse for the exchange system and, together, can guarantee quality, delivery, and payment.

Figure 1:
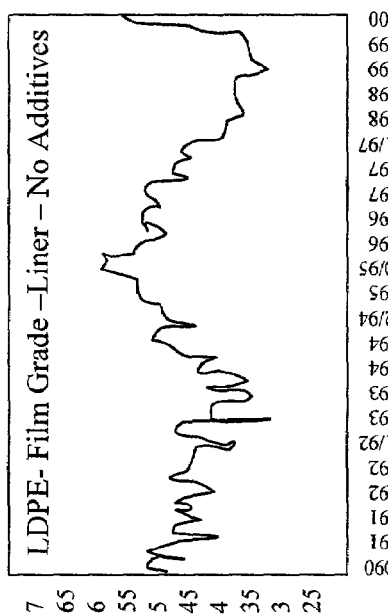
FIG. 1 illustrates a front page of an embodiment of a method and system for exchanging commodities, made in accordance with the present invention.

FIG. 1 illustrates the front page of the Website, made in accordance with the present invention. At this stage, the public has free access to historic price charts, plastics industry news, and fundamental research on the 5 plastics commodities sectors that are traded on the exchange system.

As FIGS. 2 and 3, which show the specifics of the transportation partner, illustrate, the plastics contracts are traded in two standard sizes: 42,000 lb packaged truckloads, and 190,000 lb bulk railcars. The transportation partner handles freight and logistics end-to-end, so buyers and sellers can maintain their anonymity. Thus, FIGS. 2 and 3 illustrate the specifications and details of each transportation partner.

FIGS. 4 and 5 illustrate the 27 standard contracts of prime commodity plastics resins, as well as a specification of a particular contract. Each standard contract is defined by a specific range of properties including, for example, melt flow, density and additives. For each contract, the present invention has identified all brands that conform to the specifications of the contracts, and are deliverable against the corresponding contract.

FIG. 6 displays the trading floor. Furthermore, FIG. 6 displays the tightest bid/ask market for each contract in both truckloads and railcars. This is a generic market, since all offers must conform to the specifications of the contract, a brand must be attached. The brand, however, is not shown in the generic market, only the quantity and price (there is a branded market that will be explained further later). When a buyer selects a city from his unique pull-down menu of delivery points, the transportation module of the present invention takes the newly selected delivery point and attaches it to all sell offers in the exchange system of the present invention. The system identifies all transportation routes and finds the associated freight rate for each offer and adds it to the sellers' offers and performs a sort; only the lowest offer is shown to the buyer. Based upon the best offer, and its location, the system shows the buyer what the seller (the lowest offer) sees as the best bid. If the buyer wants to be the best bid to the market, the buyer must bid higher than the bid shown on the exchange. The buyer may place a bid below the market and if the market goes down the bid may get filled.

For example, for the first contract HDPE-HIC Blow Molding, there are 3 truckloads bid at $0.572 per pound and 3 truckloads offered at $0.601 per pound; 6 railcars bid at $0.525 per pound and 3 railcars offered at $0.535 per pound. A buyer can place a bid lower, equal to, or higher than the prevailing bid with any number of contracts that he chooses. If he wishes to buy the offer, he can buy 1, 2, or 3 truckloads. If he bids $0.601 for 4 truckloads, he will purchase the 3 offered, and the new high bid will become $0.601 for 1 truckload.

Furthermore, if the buyer were to now select another city, the exchange system will once again re-price itself, and prices will be different. The quantities on the trading floor associated with the best bids and offers will likely change because the lowest offer may be coming from a different seller (probably closer in location) and he has likely offered a different number of contracts.

Clicking on any of the contracts will pop an "action box." Being selected in FIG. 6 is bid placement. Other screens that are accessed from this action box are described in detail below.

Since contracts have been standardized, buyers and sellers can post their bids and offers with only a few simple mouse clicks. When selected from the trading floor, the 'buy order entry screen,' as shown in FIG. 7, is already loaded with the contract that has been selected, the delivery point that was last used on the trading floor, and the lowest offer price in the system (the same information as detailed on the trading screen of FIG. 6). Any of these variables can be changed from the pull down menus. The only variable that needs to be selected to make a trade is the number of contracts, and whether they are truckloads or rail cars.

When the order is submitted, the order confirmation message comes up, displaying, in plain English, the order that is being placed. This is illustrated in FIG. 8.

The working order screen, as illustrated in FIG. 9, shows only those working orders for the contract that is selected (from the action box of FIG. 6, above). If the user selects 'show all' (above delivery point on the working order screen), all of the users working orders are shown. If the 'working order' button is selected from the left navigation bar, all of the users working orders will be displayed, and the user then can sort by any column, or do a search.

FIG. 10 illustrates an example of a filled order screen. When an order has been filled, the filled order screen will show the value of the purchase, as well as the status of the order. In this case, as shown by the "inventory status," the product has yet to be picked up from the sellers dock.

When an order is filled, the transportation partner is notified of both parties of the transaction by email and on their screen that they login to on the exchange system. The shipping and destination information (which is captured when members apply to the exchange) are popped up when the origin or destination location is clicked. They send a truck to the supplier's dock and transport the product to the buyers dock. When the trade happens, the seller actually sells the product to the exchange system and the exchange system sells it to the buyer. The exchange system officially takes title of the product when it is picked up, and keeps it during the transportation process and then transfers the title to the buyer on delivery.

Figure 11:
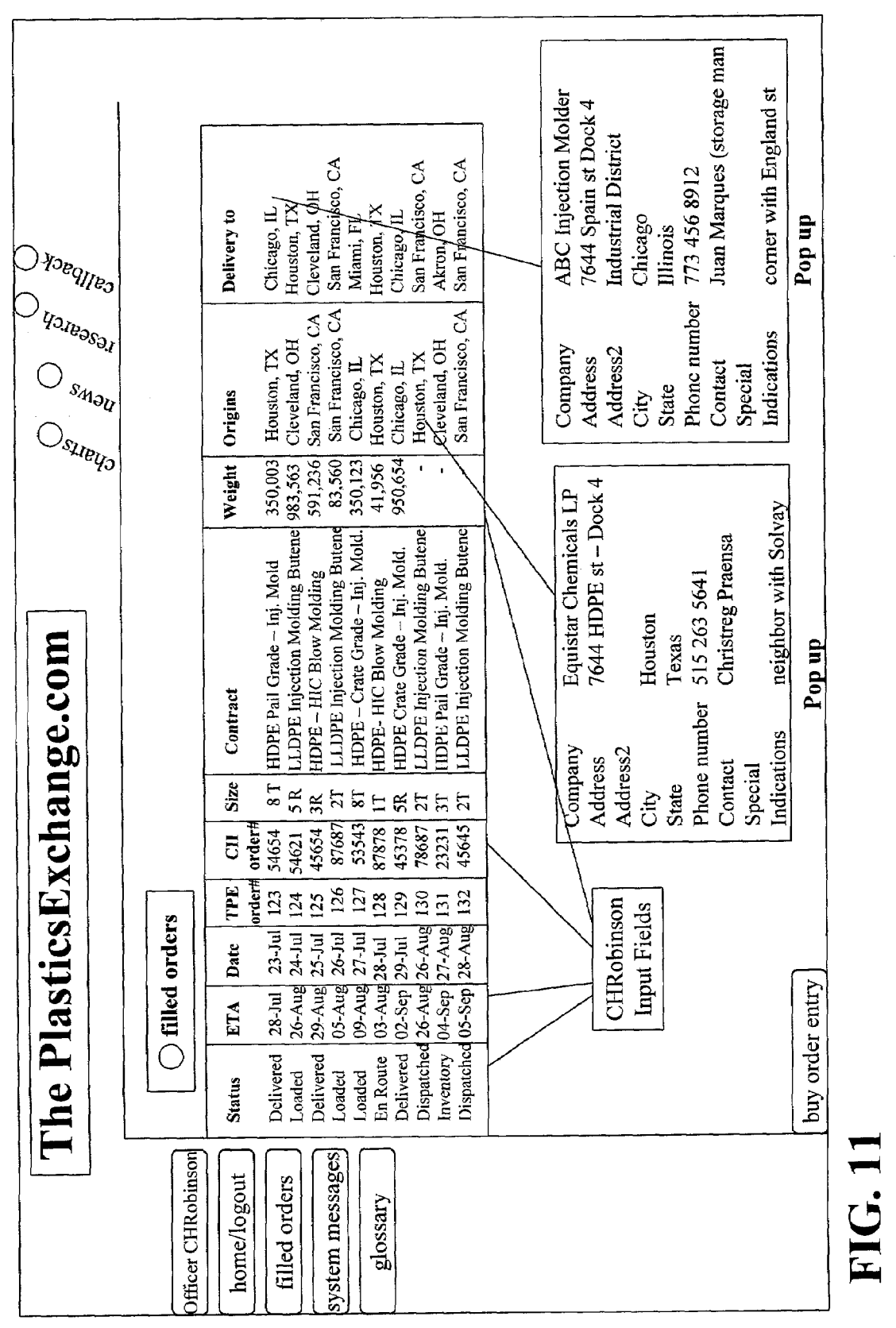

When the product is picked up from the supplier, the trucker enters the exact weight on the bill of lading; this exact weight is input by the transportation partner in the screen that they log into. The system then recalculates the exact value of the transaction; this interfaces with the credit module of the exchange system, for an exact payable to the seller and receivable from the buyer. The transportation partner then enters an ETA and also updates the status of the order from the pull down menu on their screen. The change of the status for the buyer is illustrated in the filled order screen of FIG. 11.

When the seller enters an order, as through the sell order entry screen of FIG. 12, he specifies the price that he wishes to sell his product, FOB his shipping point. He also specifies which location he will deliver from and the brand that he will deliver. He has the choice however, to only send the offer to the Generic Trading Floor, or to also include the offer in the Branded Market. The seller may chose not to send the order to the branded market, as they may be trying to 'quietly' sell surplus resin to the market and does not want to indicate to the industry that they are selling at a price lower than their prevailing contract price.

FIG. 13 illustrates the branded market screen that is seen by the buyer. Note how the sell order placed above becomes the branded offer seen below. The buyer cannot 'bid' into the offer price, only purchase the brand at the price offered. Of course, he has the generic Trading floor.

Finally, FIG. 14 illustrates a message board. The message board provides a display for quickly viewing relevant information, such as, for example, information concerning any orders being placed by both buyers and sellers, whether the order has been changed, and the current status of the order. Furthermore, all actions are recorded in the message screen. They can be deleted or archived and stored for permanent records. Working and filled orders may be output to an excel spreadsheet.

When a seller becomes a member of the exchange system, he is signing a legal document. The seller warrants, by contract, that he will only enter an order that he is ready and able to ship. He further warrants that the product shipped conforms to the specifications of the exchange system contract. If the seller is unable to fulfill this contracted obligation, the exchange system will preferably itself step in and source the product and deliver it to the buyer. Additionally, the seller has the option to request payment upon shipment for a small discount, or receive payment net 45 days. Furthermore, the buyer has the option to pay upon shipment with a small discount, net 30, or use our financing for up to 90 days.

To further the purpose of the exchange system, the system may provide the following policies to be adhered to by all participants. First, with regards to trade matching, the participants' orders are electronically matched by the exchange system based on price and time of entry. Upon the matching of a buy and sell order, the transaction becomes a legally binding contract and the exchange system generates an electronic confirmation which is automatically sent to both participants. The exchange system, in the absence of such additional delivery instructions, will initiate delivery following the participant's default instructions. Participants are required to forward additional delivery instructions to the exchange immediately following the transaction either via phone or e-mail.

Once a transaction becomes a legally binding contract, both parties to the contract must perform (Seller must deliver, Buyer must take delivery). Netting of transactions is not permitted.

Second, with regards to transportation, each contract includes the provision and cost of delivery. Delivery for truckloads shall be provided solely by the exchange system through its transportation partner. Because transportation is an integral part of each contract, each participant must provide delivery instructions to the exchange system upon approval as a participant. Neither the transportation partner nor the exchange system shall be liable for any consequential damages that occur in transit. Third, with regards to any right of rejection, a participant may only reject delivery of a contract where the product delivered does not meet the standardized contract specifications set forth in the Agreement. The participant must notify the exchange system immediately of such refusal. The exchange system, upon such notification, shall dispatch an independent party to analyze the product for compliance with the standardized contract specifications.

If the product meets such specifications, the buyer must bear the cost of such independent analysis and must accept delivery.

If the product does not meet such specifications, the seller must bear the cost of such independent analysis and the cost of return shipping. Further, the seller must accept the returned product and ship to the buyer a product that meets the standardized contract specifications.

If the seller is unable to provide such product, the exchange system will purchase a substitute product at the current market price and the seller shall be responsible for all related costs, including any difference in price.

Fourth with regards to a failure to deliver, if a seller fails to deliver any order pursuant to the terms of a contract, the exchange system may purchase the product at the prevailing market price for the benefit of the buyer and the seller shall be responsible for all costs related to such failure, including any price difference. The exchange system may offset these fees against payment due to the seller.

Fifth, regarding dispute resolution, each participant must agree that it will use its best efforts to resolve any dispute that arises between the participant and the exchange system by participating in a meeting with the management of the exchange system. If the parties cannot come to an agreement through such meeting, the participant must agree to submit to binding arbitration. Each participant must further agree to submit to binding arbitration when a dispute is brought to arbitration that involves the contraparty to any corresponding trade of the participant and/or the exchange system.

Finally, regarding business conduct, the participants must adhere to the following restrictions and requirements. The exchange system may, in its sole discretion, impose such sanctions against each participant for violating the following as the exchange system may deem reasonable and appropriate, including but not limited to fine, suspension, termination or any such other sanction.

Furthermore, neither a participant nor any employee of a participant shall engage in any fraudulent act or to deceive, trick or engage in any scheme to defraud, in connection with or related to any trade on or other activity related to the exchange system. Orders of contracts entered in the exchange system for the purpose of upsetting the equilibrium of the market and bringing about a condition of demoralization in which prices do not or will not reflect fair market values, are forbidden.

The exchange system may also prohibit manipulation of the market. That is, it shall be an offense to violate any exchange system policy regulating the conduct or business of any participant, or any agreement made with the exchange system, or to engage in fraud, dishonorable or dishonest conduct, or in conduct or proceedings inconsistent with just and equitable principles of trade, or intentionally default on the delivery of Contracts. Furthermore, it shall be an offense against the exchange system to make a misstatement of material fact to the exchange system.

Additionally, neither a participant nor any employee of a participant may use the electronic access to the exchange system in any way that would tend to bring disrepute upon the participant or the exchange system.

Figure 15:
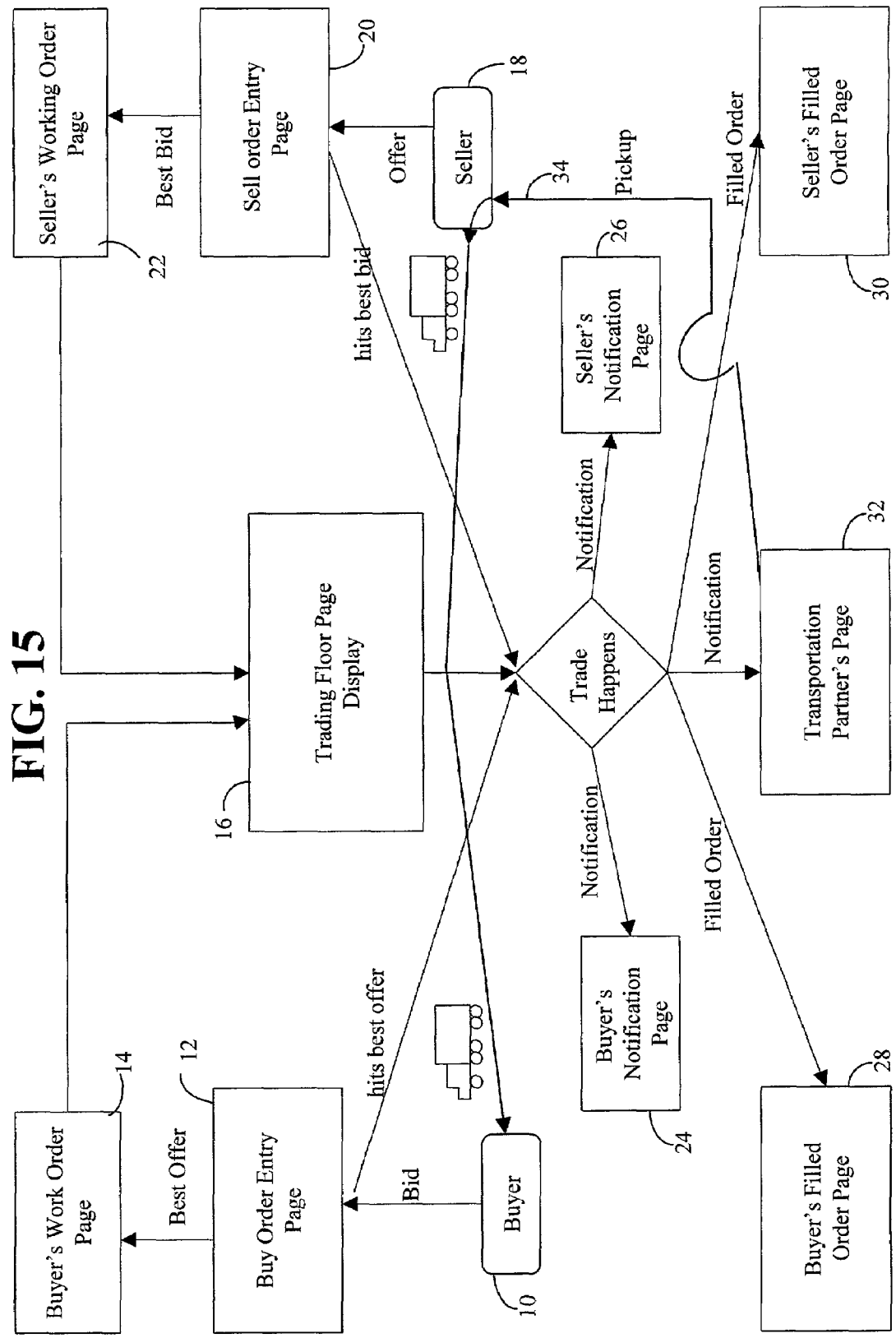
FIG. 15 illustrates a flow diagram of a method and system for exchanging commodities, made in accordance with the present invention.

FIG. 15 illustrates a flow diagram of a commodities exchange system 8. Referring to FIG. 15, a buyer 10 places a bid, as shown on the Buy Order Entry Page 12 of the exchange system 8. If the bid is less than a best offer, then the bid becomes a working order, and is displayed on the Buyer's Working Order Page 14. Additionally, the bid is displayed on a Trading Floor Page 16. A seller 18 places an order, as shown on the Sell Order Entry Page 20 of the exchange system 8. If the order is greater than a best bid, then the order becomes a working order, and is displayed in the Seller's Working Order Page 22. Additionally, the order is displayed on the Trading Floor Page 16.

If a bid and an offer match, a trade occurs, and notification is given to both the buyer 10 and the seller 18, through the Buyer's Notification Page 24 and the Seller's Notification Page 26, respectively. Additionally, both the buyer 10 and the seller 18 may be sent an email describing the transaction.

The order then appears on the Buyer's Filled Order Page 28 and the Seller's Filled Order Page 30. Furthermore, notification is given to a transportation partner on a Transportation Partner's Page 32. At this point, the transportation partner contacts the buyer 10 and the seller 18 to arrange transportation of the commodity. This process is done so that the buyer 10 and the seller 18 remain anonymous with respect to each other. Finally, as shown by line 34, the transportation of the commodity is provided by the transportation partner, preferably by either truck or rail.

Figure 16:
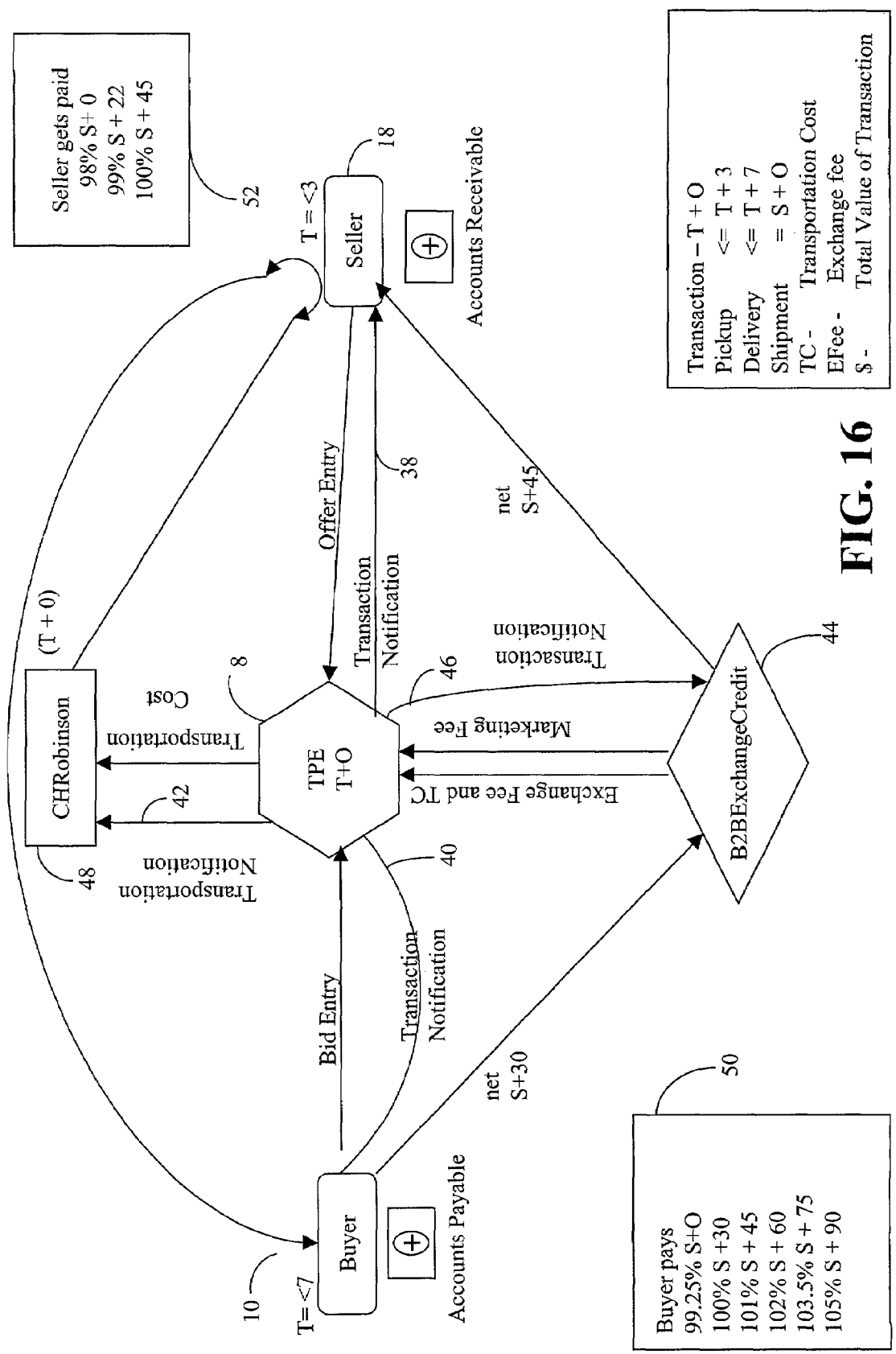
FIG. 16 illustrates a flow diagram of a method and system for an exchange of monies, made in accordance with the present invention.

Referring to FIG. 16, a flow diagram of the exchange of monies is provided. In FIG. 16, the plastics exchange 8, when a transaction occurs, submits notification to the seller 18 via line 38, the buyer 10 via line 40 and the transportation partner 48 via line 42, as previously discussed. In addition, a exchange credit entity or clearinghouse 44 is also notified via line 46. The clearinghouse 44 may also be provided as an electronic communicative node in communication with the exchange system, such as, for example, on the Internet. The clearinghouse 44 provides an exchange fee and a marketing fee for the exchange system 8. In addition, the exchange system 8 provides a transportation fee to the transportation partner 48. Upon shipment, the seller 18 may inquire to the exchange system 8 for money. For example, the exchange system 8 may pay 98% net immediately or 100% net upon the expiration of 45 days, as shown in Box 52. Also upon shipment, the buyer 10 may immediately pay, for example, 99.25% transaction value, may pay 100% transaction value after 30 days, or upon credit terms of up to 90 days, for example, as shown in Box 50.

The exchange system 8 allows the buyer 10 to filter out seller 18 to whom the buyer 10 does not want to see the buyer's bid. Additionally, the exchange system 8 allows the seller 18 to filter out its offers from being seen by certain buyers 10 at the trading floor 16.

A copy of a source code concerning an embodiment of the present invention is disclosed at Appendix A.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

The invention claimed is:

1. A system for exchanging commodities, comprising:
   means for permitting a seller to enter an offer for selling a commodity according to a predetermined contract;
   means for permitting a buyer to enter a bid for purchasing the commodity;
   means for matching the bid to the offer to generate a transaction;
   means for notifying a transportation partner of the transaction so that the transportation partner can arrange pickup and delivery of the commodity; and
   means for notifying a credit clearinghouse of the transaction so that the clearinghouse can arrange to receive payment from buyer and make payment to the seller.

* * * * *

UNITED STATES PATENT AND TRADEMARK OFFICE
CERTIFICATE OF CORRECTION

PATENT NO. : 7,624,061 B2
APPLICATION NO. : 09/922240
DATED : November 24, 2009
INVENTOR(S) : Greenberg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2467 days.

Signed and Sealed this

Twenty-sixth Day of October, 2010

David J. Kappos
*Director of the United States Patent and Trademark Office*